Jan. 16, 1934.        E. J. W. RAGSDALE        1,944,106

METHOD AND PRODUCT OF ELECTRIC WELDING

Original Filed Aug. 20, 1932

INVENTOR
EARL J. W. RAGSDALE
ATTORNEY

Patented Jan. 16, 1934

1,944,106

UNITED STATES PATENT OFFICE 1,944,106

METHOD AND PRODUCT OF ELECTRIC WELDING

Earl J. W. Ragsdale, Norristown, Pa., assignor to Edward G. Budd Manufacturing Company, Philadelphia, Pa., a corporation of Pennsylvania Continuation of application Serial No. 629,686, August 20, 1932. This application December 12, 1933, Serial No. 702,063, and in Great Britain October 28, 1930

12 Claims. (Cl. 219—10)

This invention relates to spot welding of stainless steel. More particularly my invention relates to a method of spot welding certain stainless steels hereinafter pointed out, so as to preserve or substantially preserve at the welded portions of the resulting structure, the desirable characteristics of such steels. The invention also relates to the spot welded product or structure.

One object of my invention is to greatly expand the fields of use of stainless steels of the character to which this invention is directed by providing spot welded structures made up of sheets or strips of such steels and in which the desirable properties of the steel such as its strength and its resistance to corrosion and fatigue have not been materially impaired in the fabricated structure by the spot welding operations. To this end I have provided a novel and efficient method of spot welding such steels, and the invention comprises both the novel method hereinafter described in connection with certain examples illustrating how it may be carried out, and the spot welded structure.

This application is a continuation of my pending application Serial No. 629,686, filed August 20, 1932; which was a continuation of my then pending application Serial No. 526,628, filed March 31, 1931; which was a continuation of my then copending application Serial No. 459,410, filed June 5, 1930.

Various so-called stainless steels have been developed which vary considerably in character, but so far as concerns those now known this invention is directed to and is especially useful with those stainless steels which are nickel chromium alloy steels known as austenitic stainless steels and preferably containing approximately 18% chromium and approximately 8% nickel and below .16% carbon, though these percentages may vary substantially so long as such variations do not impair to too great an extent the hereinafter described desirable characteristics of such steels for structural purposes. These austenitic stainless steels are known by various trade names such for example as "Allegheny Metal", "KA-2", and some classes of "Nirosta" and "Rezistal", etc. Because they contain approximately the percentages of chromium and nickel above mentioned they are sometimes generally referred to or classed in the trade as "18-8" steels. Some illustrations of austenitic stainless steels in which the percentage of chromium and nickel vary substantially from the approximate 18-18 figures above given without substantially imparting the desirable characteristics for structural purposes found in the 18-8 steels, are known in the trade as "U. S. 25-12" and "U. S. 12-12". In the first of these the chromium content is approximately 25% and the nickel approximately 12%. In the second, the chromium and nickel contents are each approximately 12%. My invention is equally applicable to such steels as these. It will also be understood that the invention would likewise be useful with other metals than austenitic stainless steels, if any, which might possess the same general desirable properties or characteristics for structural purposes such as great strength and resistance to corrosion and the same general properties as to welding.

Austenitic stainless steels have the desirable property for structural work of being substantially non-corrosive when exposed to the weather, sea water and even to some acids; and of developing a high tensile strength when cold worked, and a marked resistance to fatigue. They are capable of developing when cold drawn, a tensile strength of upwards of about 300,000 pounds per square inch; and when cold rolled upwards of 250,000 pounds per square inch; but they are more suitable for general structural purposes when cold worked to a tensile strength in a region of about 150,000 to 200,000 pounds per square inch, and they are generally used for structural purposes when cold worked to approximately that extent providing that the other characteristics of the metal for structural purposes are likewise proper. In this condition they have relatively high tensile strength, and are tougher and more workable than when cold rolled to a greater extent. Such steels also have a relatively high electrical resistivity, at least several times that of mild steels, and they have a relatively low melting point (that is about 2500° F.) and are more fluid immediately upon reaching their molten state than are the usual carbon steels. Their ductility is great.

By reason of their attainable strength and resistance to corrosion, these steels lend themselves admirably to structural uses and especially in structures which are exposed to the weather or subjected to considerable vibrations, and more especially where great strength with minimum weight is an important factor, such for example, as in aircraft structures. These steels also have the valuable property for some structural uses of being substantially non-magnetic.

Because of their valuable characteristics for structural purposes, and because of the unsatisfactory character of other metals for many such purposes, there has been for some time a great demand for the use of these steels for many structural purposes, but prior to my invention it was not known how these steels could be welded without destroying or substantially impairing, at the welded portions of the structures, the inherent valuable characteristics of the parent metal for structural purposes. Prior to my invention this steel had found practically no commercial field of usefulness in the cold worked state, which is the state in which it possesses the most valuable characteristics for structural purposes, and this lack of use was largely if not entirely because of the difficulty in satisfactorily joining the several parts of any structure made of this steel. Riveting of this steel is very difficult and hazardous where strength is required. The welding of this cold worked steel is also hazardous for the following reasons: First, because the steel is annealed by air cooling when brought to a temperature below its melting point, and if too much of the area of the steel is allowed to become annealed it weakens the structure at the joined areas due to the fact that the strength of the annealed steel is considerably below that of the cold worked steel, and secondly, because there is a temperature range of the metal at which carbide precipitation may occur, and this carbide precipitation will result in destroying the resistance of the metal to corrosion as well as its homogeneity. This latter feature is true as to both the cold worked and the annealed stock. This invention overcomes these difficulties, as will be later explained.

As far as I have been able to ascertain, prior to my invention little if anything was known as to the characteristics of cold worked austenitic stainless steel so far as concerned its behavior in welding. The temperature range within which carbide precipitation would occur in annealed austenitic stainless steels was known to expert metallurgists prior to my invention, and while possibly or perhaps the temperature range was also known for the cold worked austenitic steels, as far as I have been able to ascertain it was not known, and certainly it was not known to those ordinarily skilled in the welding art, and as hereinafter pointed out, I have found it to be somewhat different from the range for the annealed metal. Furthermore, as far as I have been able to ascertain, it does not appear that any one appreciated the importance played by the factor of the dwell of heat within the range of deleterious temperatures to produce carbide precipitation either in the annealed or the cold worked austenitic stainless steels.

With reference to the unsatisfactory character of other metals for many structural purposes for which this invention is especially useful, the use of other metals in structures such as aircraft structures, has been limited almost entirely to carbon and alloy steel and aluminum alloys such as duralumin. The use of carbon steel has been relatively limited particularly to tubular forms which are ill adapted to spot welding. It is subject to extreme corrosion and is not favored for interior parts which cannot be readily inspected. Duralumin and other aluminum alloys do not lend themselves to efficient and reliable spot welding because of the great electrical conductivity and relatively great heat expansion, and they are relatively weak as contrasted with cold worked austenitic stainless steels. They require greater thickness for the same strength and are readily melted when subjected to intense heat, for example, when an airship catches fire. They are particularly subject to deterioration on aging and to fatigue from vibrations. They are also susceptible to deterioration in salt water atmospheres. The complexity of structures due to riveting these parts has also rendered them undesirable.

It is well recognized that spot welding for joining together sheet or strip metal when this can be readily accomplished, is in nearly all cases far preferable to riveting, but due to certain properties or characteristics of the austenitic stainless steels they have presented special problems for the welder and cannot be welded by the usual welding methods without having their desirable properties for structural purposes destroyed or substantially impaired.

Taking for example the 18–8 stainless steels above mentioned and cold rolled to a tensile strength in the region of about 150,000 to 200,000 pounds per square inch, if it is heated to a temperature within a certain critical range (about 900° F. to 1500° F.) and the heat held within that range for too long a time the carbon which is normally in solution will be precipitated out as carbides and dispersed along the grain boundaries and/or slip planes. For the annealed stock which is usually employed with an ultimate tensile strength of about 90,000 lbs., per sq. inch, the critical range for carbide precipitation is about 1100° to 1400° F. In this state the metal is no longer homogeneous and very materially loses its resistance to corrosion and fatigue, and also its ductility and resistance to impact. It will appear from this that by using any of the usual methods of welding—spot, butt or gas,—the areas surrounding the actual weld or portion that was rendered plastic or molten and which surrounding areas are heated to within the above critical range, would lose their homogeneity and resistance to corrosion and fatigue.

Furthermore, unlike ordinary carbon steels and some other forms of stainless steel, when reheated to and quenched or air cooled from the usual softening temperature of about 2100° F. the 18–8 stainless steel does not harden but on the contrary becomes annealed, and therefore in the case of the cold worked stock it loses a substantial amount of its tensile strength, and a reheating and quenching would not re-harden the welded portions as it will in the case of mild steels and some other types of stainless steels, where reheating is feasible. It might also be pointed out that the electrical resistivity of the austenitic stainless steel is several times that of ordinary carbon steel (for the 18–8 stainless steel I believe somewhere about 6 to 10 times that of carbon steel at room temperatures, depending upon the hardness) and since the energy consumed or heat generated in an electric weld is $I^2Rt$, (where I represents the current, and R the resistance, and $t$ the time) it will be seen that the heat will be directly proportional to the resistance and therefore with a given current it will be generated much more rapidly in the body of the metal than in the case of ordinary carbon steels or other relatively low resistance metals. This relatively high electrical resistivity and the relation between electrical resistivity and thermal resistivity constitute a further danger in the spot welding of this steel requiring careful control of the welding heat to prevent too long a dwell of the undesirable temperatures in the metal.

I am aware of the fact that prior to my invention various kinds of stainless steels have been welded by the usual welding methods, such as butt welding, arc welding and spot welding (see "Welding of stainless materials" by H. Bull and Lawrence Johnson, in Industrial Gases, March and June, 1928), and the reprint thereof comprising National Advisory Committee on Aeronautics Bulletin No. 532, but such welding when applied to the character of stainless steels to which this invention is directed, is quite unreliable and unsatisfactory and results in destroying or materially impairing the desirable characteristics of such metal for many structural purposes. For example, with respect to the kind of stainless steel which had been used for knife blades, the blades had been butt welded to the metal handle or to the support enclosed in the handle, but tests of these welds showed their susceptibility to corrosion. Again, stainless steel turbine blades made of such types of stainless steel as had been used for that purpose, had been welded to their support by the oxyacetylene welding process. But here again if this were attempted on the stainless steels of the character to which my invention is directed, the desirable properties of the steel would be destroyed. In the case of the turbine blades made of the particular kind of steel used there, heat treating of that part of the structure containing the blades was resorted to in some cases, which rendered the blades softer than was their condition after the welding operation. But in such use this rendering of the metal relatively softer was desirable rather than undesirable. Again, domestic utensils such as saucepans made of certain kinds of stainless steel suitable for that purpose, had had their parts such as handles, secured by the usual spot welding, but here again even if for any reason such articles had been made of the stainless steels to which this invention is directed, the presence or maintenance of tensile strength was relatively unimportant, as was also the maintenance of the resistance of the metal to fatigue, so that the detrimental effect on the articles by spot welding according to the usual methods, was not so important.

Prior to my invention there had also been some use for relatively heavy parts in seaplanes, of a stainless steel known as "Twoscore" because of its high resistance to corrosion in sea water and because it was readily welded by the oxyacetylene method commonly used in the production of various seaplane fittings. But this particular stainless steel is an air-hardening steel and for that reason the welded parts could be re-hardened and tempered by heating after the welding, to restore the desired strength of the metal. This was not an austenitic stainless steel, but even so the fact that a subsequent heat treatment had to be given the steel showed the detrimental effect upon it of the usual welding method applied. Furthermore, in the case of a cold worked austenitic stainless steel the subsequent heat treatment suggested would have been more harmful than helpful from the standpoint of strength because the metal would be softened rather than hardened by such treatment.

With respect to austenitic stainless steels, i. e., those of the character to which my invention is directed, prior to my invention it had been said on good authority that it would appear to be necessary to re-heat the whole of all welded structures made of such steel in order to restore the property of resistance to corrosion, but as above pointed out this is often impractical if not impossible in the case of various building structures and furthermore in the case of the cold rolled stainless steels of the character to which this invention is directed, the re-heating will destroy or greatly impair the desired tensile strength.

I have found that by taking advantage of the relatively low melting point of stainless steels to which this invention is directed and their great fluidity immediately upon fusion, and utilizing very large welding currents, sufficient heat to fuse the metal and produce an excellent joint or weld, can be generated in a small fraction of a second of current application, and that by thus limiting the time of application of the relatively large current and also limiting the amount of current to not substantially more than necessary to effect the weld in this brief period of time, the period of the dwell of the heat in the metal may be made less than that which would substantially impair the desirable characteristics of the overlapped welded portions, such as the strength and anti-corrosion characteristics of the metal. For example, I have found that in welding the 18–8 steels under the above conditions the carbides will not be precipitated out at all or not to a deleterious degree in the zone (surrounding the weld) subjected to the critical temperature range which would otherwise deleteriously precipitate the carbides, and that the overlapped welded portions of the metal as a whole possess substantially the same strength and anti-corrosion characteristics as the metal remote from such portions.

While in this specification, by way of example of austenitic stainless steels, I have referred specifically to the 18–8 steels in discussing their properties as to melting temperature, annealing temperature, carbide precipitation temperature range, electrical resistivity, tensile strength, etc., it is to be understood that the other austenitic stainless steels such, for example, as the above mentioned "U. S. 25–12" and "U. S. 12–12", have substantially these same general characteristics or properties.

Prior to my invention, those skilled in the welding art did not known how to spot weld austenitic stainless steels so as to avoid substantial deleterious effects resulting from the heat of the weld. Prior to my invention it was not appreciated that a full weld in austenitic stainless steel could be effected with a dwell of heat too brief to deleteriously affect the desirable characteristics of the steel, and that these deleterious effects could be avoided by the use of this very brief dwell of the necessary heat to effect a full weld.

Stating the matter in another way, the welding operation should be carried out in such a manner as to insure a steep heat gradient in the metal both on the rise of temperature due to the application of the current, and on the fall of temperature in the quenching of the metal after the current is cut off. In this way the heat which has a deleterious effect upon the steel is limited both in degree and time of application, or amount to not substantially more than that necessary to effect the weld, and therefore it will have a minimum effect in impairing the desirable characteristics of the metal. A rapid rate of introduction of the heat, i. e., the steep heat gradient on the rise will be effected by utilizing the relatively large currents for the brief period of time plated and the rapid fall of temperature i. e., the steep down gradient will be effected both by the rapid introduction of the heat and by utilizing not substantially more heat or energy than necessary to properly weld the metal, thus enabling the metal to be more quickly quenched by the conduction of the surrounding cool metal and the electrodes. The electrodes may be water cooled if desired. If the heat is relatively slowly introduced the metal surrounding the weld would not remain cool and would therefore be less effective in quenching the metal of the welded zone. Also, other factors being the same, the more heat or energy put into the weld the more time required to quench the metal.

For a given gauge of the cold worked metal, generally speaking, the greater the amount of heat put into the weld beyond that necessary to produce the weld, the greater will be the annealed area at the welded zone. Even when the amount of heat introduced is properly controlled the small nugget of metal which was rendered molten or plastic to effect the weld, becomes annealed, but since this is quite small and is practically encased within the harder metal, it is not harmful and in fact its being annealed is possibly of advantage under prying or twisting strains; but if too great an excess of heat beyond that necessary to effect the weld is introduced, the nugget is unduly enlarged and in addition to this an unnecessarily large area of the metal surrounding it also becomes annealed, which will result in weakening the welded structure where the spot welds occur. Furthermore, as to both the cold worked and the annealed stock, the introduction of too great an excess of heat either by too long an application of proper current or by too large a current, or both, will precipitate the carbides in a substantial zone surrounding the annealed zone, to render the first mentioned zone either quite corrodible or to substantially impair its resistance to corrosion.

These deleterious effects resulting from the introduction of an excess of heat or undue dwell of heat may take place without being detected from the mere appearance of the welded zone, and may only be discovered by microscopic examination or by other tests for strength and corrosion, so it is important to properly and accurately regulate both the amount of current and the time of application thereof to insure uniform and reliable welds.

The pressures used in spot welding according to my invention may be relatively high and are preferably such in order to insure good point contact, the bringing of the overlapped portions of the adjacent sheets into firm contact immediately under the points, and to insure the desired rapid heat conduction from the interior of the weld out through the electrodes. The pressure should be sufficient to take care of these features and to insure uniform welding. Some examples lying within the general range of pressures used by me will be hereinafter given in connection with current values and times of application of current.

In this specification I use the term "corona" to designate the zone of metal which has been subjected to the heat from the weld per se and which encompasses the weld nugget. The weld per se constitutes the fused nugget which has been rendered molten or plastic, and I use the term "corona effects" as defining effects or conditions in the metal in said zone.

With further reference to my invention, according to my method of spot welding the austenitic stainless steels, the resulting diameters and areas of the coronas are relatively very substantially smaller as compared with the coronas of spot welds resulting from the former method of welding ordinary carbon steels of a corresponding gauge. The nugget of the weld which is rendered molten or plastic may also be relatively substantially smaller than the molten metal of the welded carbon steel of similar gauge as heretofore welded. Furthermore, in spot welds made according to the preferred practice of my invention the nugget itself does not extend quite to the outer surfaces of the two adjacent sheets of metal, its thickness being preferably from 50 to 80% of the total thickness of the two sheets in which it is encased, although discoloration or effects of the heat may be visible at the small surface areas above and below the nugget; but the invention is not to be limited to this preferred practice.

As compared with currents or current densities utilized in welding and the periods of application of those currents, as commonly utilized in ordinary carbon steel welding and as heretofore utilized in the welding of stainless steels of such character as have been limitedly spot welded, my method contemplates utilizing currents very substantially higher, and periods of application of currents very substantially shorter. Due to the many factors that enter into spot welding according to my invention, which affect the character of the welded joint, such for example as the current density, the time of application of the current, the size of the electrodes used in each case, whether the electrodes are water cooled or not, the pressure of the electrodes and the thickness of the stock being welded, it will be obvious to one skilled in the art that there is no definite current density or time of application of current which will hold good for all combinations of factors. It will therefore be understood that the currents, times of application of current and other factors hereinafter mentioned, as well as those given in the examples, are merely by way of illustration of such factors as have actually been successfully used, and it is believed that they are sufficiently comprehensive to serve as a general guide for those skilled in the art. According to the manner in which I have practiced the invention, in its preferred form, the current density generally speaking, is decreased and the time of application of the current is increased with the thickness of the metal welded.

As to currents, they may be, say of the general order of about 300,000 amperes per square inch of weld area, (measured transversely of the direction of flow of current through the weld), for intermediate gauges of from about .03 to .05. In practice, I have not used currents as low as 100,000 amperes per square inch of weld area on any thickness of stock, but I have used as low as about 175,000 amperes per square inch on heavier gauges of about $\frac{1}{8}$"; and a large amount of spot welding has been done according to my invention on stock of from about $\frac{1}{16}$ of an inch to about .01 with current densities of between about 250,000 and 800,000 amperes per square inch of weld area and even higher.

As to the periods of application of the current, for gauges of approximately .008" to $\frac{1}{16}$" the periods may be of the order of from about 1/500 of a second to about $\frac{1}{10}$ of a second, depending upon the current density, the thickness of the metal and the other factors above mentioned. A great amount of spot welding has been done according to my method utilizing times of from about 1/100 to about $\frac{1}{10}$ of a second with metal of a thickness of about .008" to $\frac{1}{16}$". It will be understood, of course, that these time figures represent time of application of the current as taken at the primary of the transformer, and as usual in computing time for spot welding.

When I refer to the time of application of current I mean the application of the effective welding current and do not include the non-effective taper-off current occurring in cutting off the current through resistances.

Accurate devices for regulating the amount and time of application of the current have been developed, so that they can be properly controlled. One machine successfully utilized in carrying out my invention is shown in my copending application Serial No. 495,044, filed November 12, 1930. It is my concept that the upper limit of current density and the lower limit of the time of the application of the current are the limitations of timing apparatus capable of accurately measuring and cutting on and off of the current within desired very short periods and the limitations of the welding circuit. With the shorter time intervals extremely high currents become necessary requiring not only transformers or other sources of power of great size, but also circuits and electrodes of great cross-section and of minimum circuit length for the cutting down of the resistance and inductance.

The following examples will illustrate some instances of the use of the invention as applied to spot welding of parts made of cold rolled austenitic stainless steel having an ultimate strength of about 160,000 lbs. per sq. inch. It is to be understood that the figures herein given in these examples, for the different individual factors or elements involved, are given by way of example only, and that one or more of them may be varied with respect to the others to get a different but satisfactory combination of factors so long as the total heat delivered is sufficient to make a full weld and the dwell of heat in the welding zone is insufficient to produce the above pointed out deleterious effects on the joint, i. e., is insufficient to substantially deleteriously affect the area of the overlapped welded portions of the metal as a whole both as to its resistance to corrosion and its tensile strength.

In the examples the current values are given in terms of the density per square inch of area of the welds themselves, (measured transversely of the direction of current flow) since this has been found the most accurate method of comparison. The sizes of the welds for given electrode diameters may be varied by varying the current density and time. The electrode sizes are varied largely to accord with the dimensions of the work being done, e. g., thickness of gauge, stiffness and relative alignment of parts, pressure needed to draw them together, accessibility to the spot to be welded, etc. In the welding of stock from .008" to 1/16" the diameter of electrodes have varied from about 1/16" to about 1/2".

*Example A*

Gauge—2 thicknesses, each_____ .010 inches
Diameter of electrode_____ 3/16 inches
Area of resulting weld_____ .00165 sq. in.
Total electrode pressure_____ 75 pounds
Welding time_____ .0083 seconds
Welding current_____ 1472 amperes
Current density in welded area_ 894,000 amp. per sq. in.

*Example B*

Gauge—2 thicknesses, each_____ .015 inches
Diameter of electrode_____ 3/8 inches
Area of resulting weld_____ .078 sq. in.
Total electrode pressure_____ 500 pounds
Welding time_____ .033 seconds
Welding current_____ 3835 amperes
Current density in welded area_ 487,000 amp. per sq. in.

*Example C*

Gauge—2 thicknesses, each_____ .030 inches
Diameter of electrode_____ 3/8 inches
Area of resulting weld_____ .0143 sq. in.
Total electrode pressure_____ 500 pounds
Welding time_____ .0583 seconds
Welding current_____ 4415 amperes
Current density in welded area_ 308,700 amp. per sq. in.

*Example D*

Gauge—2 thicknesses, each_____ .040 inches
Diameter of electrode_____ 3/8 inches
Area of resulting weld_____ .0143 sq. in.
Total electrode pressure_____ 500 pounds
Welding time_____ .0750 seconds
Welding current_____ 4240 amperes
Current density in welded area_ 296,500 amp. per sq. in.

*Example E*

Gauge—2 thicknesses, each_____ .050 inches
Diameter of electrode_____ 3/8 inches
Area of resulting weld_____ .0143 sq. in.
Total electrode pressure_____ 500 pounds
Welding time_____ .0833 seconds
Welding current_____ 4270 amperes
Current density in welded area_ 298,200 amp. per sq. in.

In the above specific examples the weld areas were measured microscopically after fracture, polishing and etching. This method has been adopted as the most accurate way of measuring the weld areas since it completely eliminates any burr surrounding the true section of the nugget or weld. In the specific examples given in my former application of which this is a continuation, the measurements of these relatively small weld areas were made after fracture of the weld without resorting to etching and microscopic examination, which was subsequently determined upon, and it has been found that the former and less accurate method of making these measurements is apt to result in a substantial difference in computing the current density of the weld area. Therefore, the above examples have been substituted for the former examples, although the actual total currents and times there given are correct.

In detail, according to this invention, and with respect to its application to cold rolled austenitic stainless steel, the steel is initially hot rolled and sometimes cold rolled and annealed in sheet or strip form of very great length suitable for mass handling in coils, and then the full characteristics, particularly the strength of the steel as required in the structure as completed for use, are developed by a final cold rolling of the strip or sheet initially formed by rolling. The cold rolled strip if it is to be shaped, is then draw rolled etc. without substantial change in its physical characteristics to give it the required angular cross-section of the elements of the structure to be fabricated. The elements are then cut into suitable lengths and the ends thereof and intermediate portions if necessary, are then fashioned to constitute the lapped portions of the joints of the structure. The elements are then assembled together with their ends and/or other portions in the lapped relation of the joints. Thereupon the lapped portions are electrically spot welded together under the relatively high currents and brief periods of current application as specified above, so as to properly limit the amount of heat generated in the weld to avoid the deleterious dwell of the heat in the weld as above pointed out.

Further explanation and description of the invention will be aided by the accompanying drawing illustrating by way of example the character of spot welds made according to the preferred practice of my method and a structure thus welded and embodying my invention. It is obvious that all of the drawings are not made to the same scale. With respect to the drawing, Fig. 1 is a side elevation of a trussed wing rib structure for an airplane, made of austenitic cold rolled stainless steel, the parts of which have been spot welded together according to my method;

Figure 1:
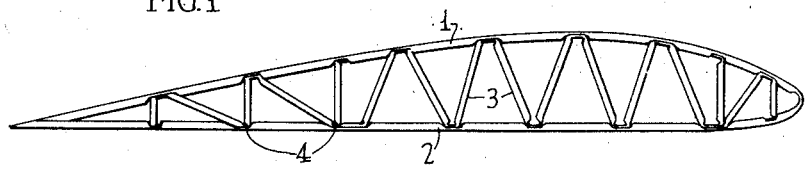
Figure 2:
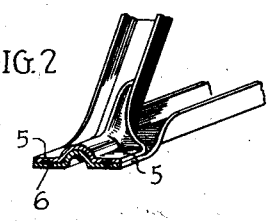
Fig. 2 is an enlarged view of a perspective detail partly in section of one of the welded joints of this structure.

The trussed or rib structure of Fig. 1 is comprised of upper and lower chord elements 1 and 2 of channel cross-section, and an internal Warren trussing 3 the main body of which is likewise of channel cross-section. At the joints 4 of the structure the elements are provided with flattened portions 5 (see Fig. 2) which are overlapped upon each other to constitute the joints. It is these overlapped portions which are spot welded together as shown at 6 in Fig. 2.

The structural elements shown are formed in this instance of strip stock of cold rolled austenitic steel made as heretofore described or in any suitable modified manner. The elements are assembled and the flattened portions to be joined are then electrically spot welded together in accordance with the invention herein described.

Figure 3:
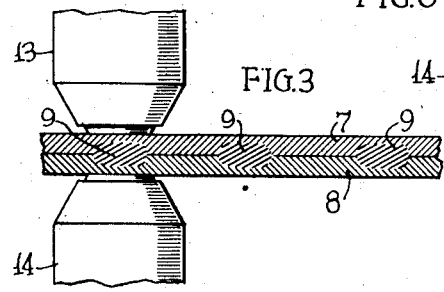
Fig. 3 is a more enlarged vertical cross-section through a plurality of spot welds in such steel, showing in general their relation to the surrounding body of material and the electrodes utilized in the spot welding.

In Fig. 3 the two strips of material are illustrated at 7 and 8 and the fused or molten nuggets produced according to this invention to weld the parts together, are shown at 9.

Figure 4:
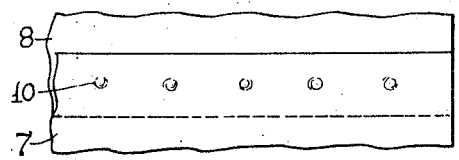
Fig. 4 is a plan view of a lapped welded joint of such steel showing the appearance of the corona at the outer surface of the metal at the welded points.
Figure 5:
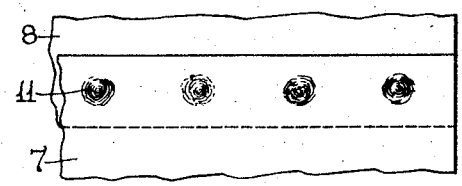
Fig. 5 is a similar plan view showing by comparison the appearance of the corona at the outer surface of the metal of ordinary carbon steel stock as welded according to prior practice.

In Fig. 4 the relatively small areas 10 illustrate to what slight extent the surface of the metal has been visibly affected by the welding operation, and it will be seen from a comparison of this with the relatively large corona areas 11 of Fig. 5, representing prior methods of welding, that the surface of the metal welded according to my invention has been disturbed to a much less degree. It will be understood, however, that the illustrations in Figs. 4 and 5 are merely relative to show the difference in the areas of the outer surface of the metals at the spot welds when they are carried out respectively by my method and by the former methods.

Figure 6:
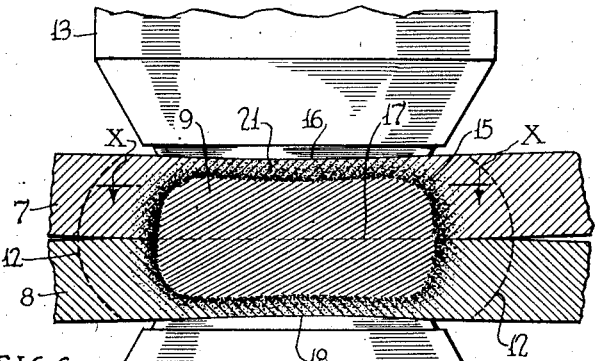
Fig. 6 is a greatly enlarged vertical cross-section through a weld of the austenitic cold worked stainless steel, made according to the invention.

Referring to Fig. 6, the welded sheets 7 and 8 and the nugget 9 which has been rendered molten or plastic, are shown on a much enlarged scale. This figure shows approximately an example of the relative size of a nugget with respect to one set of electrodes and the thickness of the welded sheets, and illustrates approximately the extent to which the molten or plastic metal has approached the outer surfaces of the sheets. Obviously all welds made according to my invention will not or may not be as illustrated in this figure which is shown merely by way of example, but it substantially correctly illustrates a typical weld (in 18–8 cold rolled stock) made according to the present preferred practice of my method.

It will be seen from this figure that the nugget 9 of metal which has been rendered molten or plastic to effect the joint or weld, does not extend laterally appreciably beyond the edges of the electrode and its lateral dimensions may be and often are substantially less than the diameter of the electrode. Due to the rapid introduction of the heat and quenching of the metal, the spread of this nugget laterally is greatly limited.

With further reference to Fig. 6, lines 12—12 shown thereon are intended to indicate approximately the inner boundary of that portion of the corona where carbides would be precipitated out to a deleterious extent if the heat dwell was not so controlled as to avoid such precipitation of the carbides. Tests have shown that when the welding is not carried out according to my invention the carbides are precipitated out to a deleterious extent in a zone surrounding the weld commencing at a distance from the nugget relatively substantially as shown by the lines 12—12, and extending outwardly laterally from such a line, this being the portion of the metal or corona surrounding the nugget in which the heat would dwell within the critical range above given which would result in substantial precipitation of the carbides if the welding was not carried out according to my invention. The inner border of this zone represented by the lines 12—12 might even be further removed from the nugget depending upon whether a still greater amount of heat was utilized in the welding for a given gauge of metal. The lines 12—12 are not intended to represent the actual distance in any case between the carbide-precipitating zone of the corona and the nugget, but are merely to show that the precipitation of the carbides would not start right at the nugget. Since the annealing temperature of the steel is less than its melting point, there will be a certain zone of annealed metal which has not been rendered molten and which will commence at the nugget and extend outwardly toward the carbide precipitation zone. Where the welds are made according to my invention these annealed zones will be so restricted, as illustrated at 15 in Fig. 6, that they will not be sufficient in extent to substantially deleteriously affect the tensile strength of the area of the overlapped welded portions of the metal as a whole. But, if the welding heat is not controlled according to my invention, an excessive amount of heat would be applied and there would be an unduly wide zone of metal between the nugget and the lines 12—12 which would be softened, resulting in an undesirable weakening of the welded structure. Also, as has already been pointed out, the outer surfaces of the welded strips would be detrimentally affected.

It will be understood that in welding the annealed stock the structure remains annealed throughout the weld and the corona zone.

Since in such welds as shown the molten or plastic nugget does not extend to the outer surfaces of the joined sheets it is substantially encased in metal which has not been rendered molten or plastic. It will also be made more apparent from Figure 6 that not substantially more heat or B. t. u.'s have been put into the weld than necessary to render the central portion of the metal substantially molten or plastic to effect an interflow of molten metal in this small area sufficient to effectively join the contacting sheets. Since not substantially more heat has been introduced into the joint than is necessary to effect the welding, and this energy has been introduced in an extremely short time, the surrounding metal and the electrodes remain relatively cool and this enables a rapid quenching of the metal when the current is cut off, thus the above described steep heat gradient both as to rising and falling temperature is effected and all of the metal surrounding the nugget is subjected to a minimum heat effect consistent with properly joining the sheets together and thus to a minimum change in its desirable characteristics.

With further reference to Fig. 6, the heat is developed by the passage of current between the two electrodes 13 and 14 through the material of the two sheets and at the surfaces of contact 16 and 18 under the electrodes and at 17 between the two sheets; the rate of heating in any portion of this region being proportional to the square of the current density and to the resistivity of that portion. In the case of the spot welding of mild steel the resistivity of the steel itself is very low as compared with that of the contact surfaces. But in the case of the material under consideration, the resistivity of which is six to ten times that of mild steel, a relatively larger amount of heat is developed within the body of the material itself. Owing to the cooling effect of the electrodes, the material in contact with them is kept below the melting point, although results show that usually it has been raised to the annealing temperature which is about 2100° F. Under some conditions the metal 21 between the electrodes and the upper and lower boundaries of the annealed metal 15 may be quenched so rapidly as to retain the full cold rolled strength of the parent metal. A portion of the metal on either side of the contact surface 17 is actually melted or at least raised to such a temperature that its re-crystallization is as complete as if it were melted. This portion constitutes the nugget 9 in Fig. 6. The portion of the metal indicated by the stippled band 15 has been raised to the annealing temperature and quenched by the cooling effect of the two electrodes and by the cooling effect of the cold metal surrounding the nugget. Moreover, the nugget itself has been likewise quenched from a higher temperature. Thus the whole body of material including the nugget and the band 15 has been annealed since this variety of steel is annealed by exactly that process, namely, raising to a temperature of approximately 2100° F. or above and quenching or suddenly cooling.

Remembering that all the material within the annealed zone has been raised to at least the annealing temperature of 2100° F., it is obvious that there are zones exterior thereto which have experienced intermediate temperatures, for example, the zone just outside the annealed zone will have experienced a temperature less than 2100° F. and rapidly cooled, and a zone still further out raised to a still lower temperature and rapidly cooled. This heating and cooling in the different zones is illustrated in a rough general way in Fig. 7 where curve N approximately represents the variation of the temperature of the nugget from the beginning of the weld until it is cooled down again to the surrounding temperature. Curve A represents a similar heat history of the metal in the annealed zone, it being understood that these curves give merely a general picture of the average heat history of the metal in the two zones.

Figure 7:
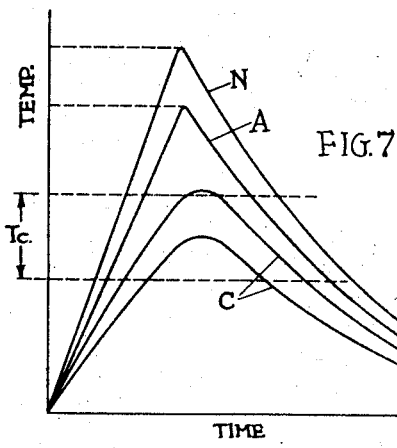
Fig. 7 is a set of curves indicating in a general way the time variation of temperatures in different parts of the metal in welding said austenitic stainless steels.

Curves C, C of Fig. 7 show in a rough way the heat history of the metal in the zone where substantial carbide precipitation would take place if the welding was not carried out according to this invention, said zone commencing at the lines 12—12 and extending outwardly therefrom.

So far as concerns carbide precipitation, in zones where the metal has been raised to a temperature appreciably above the carbide precipitation temperature range, no appreciable carbide precipitation is apt to take place since on the application of the heat the structure of the metal would have been changed from that corresponding to carbide precipitation to some other state as the temperature rises, and there would be no carbide precipitation excepting that due to the time required for the temperature of the metal concerned to pass back through the carbide precipitation zone on the downward gradient of the heat, i. e., upon cooling of the metal. But the serious danger from carbide precipitation is to be found in that zone of the metal in which the heat rises substantially into the carbide precipitation temperature range Tc and does not extend substantially above it. In other words, the zone in which carbide precipitation is most likely to occur to any appreciable extent is that within which the metal has been raised well up within the precipitation temperature range, held there long enough and cooled from that point. In such zone of the metal the heat, if not controlled according to my invention, would dwell for an appreciable time within the critical temperature range and the carbides will be substantially precipitated.

If the welding heat is supplied with sufficient rapidity, there is no time for heat flow from the nugget into the surrounding metal except during the cooling period, thus the total amount of heat to be dissipated during the cooling period is less and the rate of cooling correspondingly greater. This is particularly true in the zones outside of the nugget proper where the influence of the electrodes is to produce rapid cooling or practical quenching for the thin sheets under consideration. For much thicker sheets even, the nugget would cool less rapidly in the case of slower application of the welding heat.

It will therefore be seen that the shorter the time of application of the welding heat, the narrower the carbide precipitation zone and the shorter the time during which it is held in the carbide precipitation temperature range. For a longer period of heat application or of current flow, the curves C—C of Fig. 7, while keeping the same height would spread out with a flatter time-temperature gradient both ascending and descending, that is during both the increase and decrease of temperature through the carbide precipitation range. No matter how short the period of heat application, there will always be a zone whose temperature has been carried up into the carbide precipitation range then down and out again, the difference being that with relatively short periods of heat application according to this invention, this zone is narrower and remains in the carbide precipitation range for too short a period to be deleteriously affected.

The most exacting tests have shown that the corona areas of spot welds made according to my invention have not had their resistance to corrosion impaired or appreciably impaired, and these tests have consisted not only in subjecting the outer surfaces of the metal at the weld to attack by corrosion influences, but by similarly testing lateral sections through the weld such as sections along the line X—X of Fig. 6. It has been shown by tests on a large number of the welds that nuggets possess excellent shear strength; the strength of many of them ranging as high as approximately 70,000 pounds per square inch and some of them considerably higher, but these figures are given merely by way of illustration and not by way of limitation of the invention. The weld in shear shows up to 20 to 40 percent stronger than a rivet of the same cross section of the same stainless steel. Such rivets are upset cold from annealed stock. Structures of the cold worked stock formed by spot welding according to my invention, have been tested as to strength, and they show that the strength of the overlapped welded portions of the metal as a whole has not been substantially deleteriously affected by the welding, and that these overlapped welded portions approach for practical purposes the strength of the parts of the structure remote from the welded portions.

While I have discussed the invention in connection with its application to austenitic stainless steel, it will be apparent to one skilled in the art after understanding the foregoing teachings and benefits of this invention in welding such steels that, as previously pointed out the invention will also be applicable to metals other than austenitic stainless steel, if there be any, which possess the desirable properties of great strength and resistance to corrosion which characterize these steels and which will have these properties substantially impaired when such metals are welded into fabricated structures, unless the welding is carried out according to this invention. And I wish to be understood as including such metals, if any, in the term austenitic stainless steel as used in the appended claims.

While by way of illustration and example I have described my invention in connection with a preferred embodiment thereof as to structure, and the preferred manner of practicing the method, it will be obvious to those skilled in the art, after understanding the foregoing, that various changes and modifications may be made without departing from the spirit or scope of the invention, and I aim in the appended claims to cover all such modifications and changes.

What I claim is:

1. The method of spot welding austenitic stainless steels which comprises utilizing relatively high currents with brief times of effective application thereof, such as to introduce the heat into the metal sufficient to effect a weld and to quench the metal in such a brief period of time that the dwell of heat within the carbide precipitation range of temperatures is insufficient to produce carbide precipitation to such a degree as to substantially affect the resistance of the metal to corrosion.

2. The method of spot welding cold worked austenitic stainless steels which comprises making a joint with a number of welds, utilizing for each weld a relatively high current with a brief time of effective application thereof, such as to introduce the heat into the metal sufficient to effect a weld and to quench the metal in such a brief period of time that the dwell of heat within the carbide precipitation range of temperatures is insufficient to produce carbide precipitation to such a degree as to substantially affect the resistance of the metal to corrosion, which method is characterized further by the fact that that portion of the mass of the metal which surrounds the nugget of each weld and reaches the annealing temperature, is insufficient to materially detract from the cold worked strength of the joint as a whole.

3. Method of spot welding cold worked austenitic stainless steels which comprises making a number of welds, utilizing for each weld a relatively high current with a brief time of effective application thereof, such as to produce sufficient heat in the metal to effect a weld but introducing the heat into the metal and quenching the metal in such a brief period of time that the dwell of heat in any part of the metal within the temperature range which would produce carbide precipitation and within the temperature range necessary for annealing said steel is insufficient to substantially deleteriously affect the area of the overlapped welded portions of the metal as a whole both as to its resistance to corrosion and its tensile strength.

4. Method of spot welding cold worked austenitic stainless steels which comprises utilizing relatively high currents with brief times of effective application thereof, such as to introduce the heat into the metal sufficient to effect a weld and to quench the metal in such a brief period of time that the heat gradient is so steep both as to the rise and fall of temperature that the dwell of heat within the carbide precipitation range of temperatures is insufficient to produce carbide precipitation to such a degree as to substantially affect the resistance of the metal to corrosion.

5. The method of spot welding cold worked austenitic stainless steels of thicknesses of from about .015 to .05 of an inch, which comprises making a joint with a number of welds, utilizing for each weld a current of the range of from about 600,000 amperes per square inch down to about 250,000 amperes per square inch of weld area, and with a brief time of effective application of the current, the time range being from about 2/100 of a second up to about $\frac{1}{10}$ of a second, the current density decreasing and the time of current application increasing in general with the thickness of the metal, whereby the area of the overlapped welded portions of the metal as a whole is not substantially deleteriously affected either as to carbide precipitation or tensile strength.

6. A fabricated structure made of two or more overlapped parts of austenitic stainless steel spot welded together according to the method of claim 1 and having within the zone of metal heated by the welding current insufficient carbide precipitation to substantially affect the resistance of such zone of metal to corrosion.

7. A fabricated structure made of two or more overlapped parts of cold worked austenitic stainless steel spot welded together according to the method of claim 4 and containing spot weld nuggets of annealed metal surrounded by coronas, said nuggets and coronas having insufficient carbide precipitation to substantially affect their resistance to corrosion.

8. A fabricated structure comprising two or more overlapped parts of cold worked austenitic stainless steel spot welded together according to the method of claim 3 and having spot weld nuggets of annealed metal surrounded by coronas, said nuggets and coronas having insufficient carbide precipitation to substantially affect their resistance to corrosion, and the zones of annealed metal surrounding the nuggets being restricted so as to insubstantially affect the strength of the structure as a whole.

9. A fabricated structure made of two or more overlapped parts of cold worked austenitic stainless steel spot welded together by the utilization of relatively high currents with brief times of effective application thereof, such that the carbide precipitation in the zone of metal heated by the welding current is insufficient to substantially affect the resistance of such zone of metal to corrosion.

10. A welded structure comprising two overlapped pieces of austenitic stainless steel welded together by a nugget of such metal which has been fused or melted and annealed upon cooling and which is encased within said two pieces of steel, and having a thickness of unfused metal above and below the nugget at each outer surface of the two pieces of steel, and the metal in the zone surrounding the nugget being substantially free from carbide precipitation.

11. A welded structure comprising two overlapped pieces of cold worked austenitic stainless steel welded together by a nugget of such metal which has been fused or melted and annealed upon cooling and which is encased within said two pieces of steel, and having a thickness of unfused metal above and below the nugget at each outer surface of the two pieces of steel, the nugget having a zone of annealed metal surrounding it so restricted as not to substantially deleteriously affect the strength of the structure as a whole, and the metal in the zone surrounding the annealed portion being substantially free from carbide precipitation.

12. A welded structure comprising two overlapped pieces of cold worked austenitic stainless steel welded together by a nugget of such metal which has been fused or melted and annealed upon cooling and which is encased within said two pieces of steel, and having a thickness of unfused metal above and below the nugget at each outer surface of the two pieces of steel, the thickness of the nugget being from about 50 to 80% of the total thickness of the two pieces of steel in which it is encased, and the nugget having a zone of annealed metal surrounding it so restricted as not to substantially deleteriously affect the strength of the structure as a whole, and the metal in the zone surrounding the annealed portion being substantially free from carbide precipitation.

EARL J. W. RAGSDALE.